(12) United States Patent
Rosen

(10) Patent No.: US 9,554,345 B2
(45) Date of Patent: Jan. 24, 2017

(54) AVOIDANCE OF NETWORK INTERFERENCE BETWEEN THERMOSTATS IN A PLURALITY OF PROXIMATE WIRELESS MESH NETWORKS

(71) Applicant: Howard Rosen, Montreal (CA)

(72) Inventor: Howard Rosen, Montreal (CA)

(*) Notice: Subject to any disclaimer, the term of this patent is extended or adjusted under 35 U.S.C. 154(b) by 152 days.

(21) Appl. No.: 14/058,568

(22) Filed: Oct. 21, 2013

(65) Prior Publication Data

US 2014/0112331 A1    Apr. 24, 2014

Related U.S. Application Data

(60) Provisional application No. 61/716,117, filed on Oct. 19, 2012.

(51) Int. Cl.
*H04W 56/00* (2009.01)
*H04W 84/18* (2009.01)
*H04W 72/08* (2009.01)

(52) U.S. Cl.
CPC ....... *H04W 56/0015* (2013.01); *H04W 72/082* (2013.01); *H04W 84/18* (2013.01)

(58) Field of Classification Search
CPC . H04W 56/0015; H04W 84/18; H04W 72/082
See application file for complete search history.

(56) References Cited

U.S. PATENT DOCUMENTS

| 8,190,728 | B1* | 5/2012 | Wainscott, Jr. ... | H04L 12/40006 700/19 |
| 2008/0253386 | A1* | 10/2008 | Barum ................ | H04L 45/00 370/406 |
| 2012/0039190 | A1* | 2/2012 | Vasseur .............. | H04L 45/04 370/252 |
| 2013/0121335 | A1* | 5/2013 | Hui .................... | H04L 12/18 370/390 |

* cited by examiner

*Primary Examiner* — Walter Divito
(74) *Attorney, Agent, or Firm* — Hankin Patent Law, APC; Kevin Schraven; Anooj Patel

(57) ABSTRACT

An apparatus and/or method is described providing for expansion of the number of nodes in an HVAC thermostat control network utilizing a wireless mesh network beyond the limits of a single mesh network by utilizing a synchronization signal to offset periods of high wireless mesh network traffic.

4 Claims, 3 Drawing Sheets

AVOIDANCE OF NETWORK INTERFERENCE BETWEEN THERMOSTATS IN A PLURALITY OF PROXIMATE WIRELESS MESH NETWORKS

CROSS-REFERENCE TO RELATED APPLICATION

This application takes priority from U.S. Provisional Application No. 61/716,117 filed on Oct. 19, 2012. The provisional application is titled: "AVOIDANCE OF NETWORK INTERFERENCE BETWEEN THERMOSTATS CONNECTED INA PLURALITY OF WIRELESS MESH NETWORKS" with named inventor Howard Rosen, the contents of which are expressly incorporated herein by this reference as though set forth in their entirety, and to which priority is claimed.

BACKGROUND OF THE INVENTION

The present invention relates to Heating Ventilation and Air Conditioning (HVAC) systems, improving operation of these systems, and providing for improvements in the methods, and/or algorithms used in the management of energy used by these HVAC systems. The present invention relates to the art of providing improved communication and increasing the range and number of thermostats or other comments of a Heating Ventilation and Air Conditioning (HVAC) system connected in a plurality of wireless mesh networks.

Control and communication to and between a number of thermostats and other HVAC components can be provided with a wireless network in which thermostats and other HVAC components serve as nodes in a wireless mesh network. Each of the nodes communicates with other nodes and nodes can forward data from node to node in order to build a network with extended range.

Wikipedia (http://en.wikipedia.org/wiki/Wireless_mesh_network) describes a wireless mesh network as follows.

> A wireless mesh network (WMN) is a communications network made up of radio nodes organized in a mesh topology. Wireless mesh networks often consist of mesh clients, mesh routers and gateways. The mesh clients are often laptops, cell phones and other wireless devices while the mesh routers forward traffic to and from the gateways which may but need not connect to the Internet. The coverage area of the radio nodes working as a single network is sometimes called a mesh cloud. Access to this mesh cloud is dependent on the radio nodes working in harmony with each other to create a radio network. A mesh network is reliable and offers redundancy. When one node can no longer operate, the rest of the nodes can still communicate with each other, directly or through one or more intermediate nodes . . . . A wireless mesh network can be seen as a special type of wireless ad-hoc network. A wireless mesh network often has a more planned configuration, and may be deployed to provide dynamic and cost effective connectivity over a certain geographic area. An ad-hoc network, on the other hand, is formed ad hoc when wireless devices come within communication range of each other. The mesh routers may be mobile, and be moved according to specific demands arising in the network. Often the mesh routers are not limited in terms of resources compared to other nodes in the network and thus can be exploited to perform more resource intensive functions. In this way, the wireless mesh network differs from an ad-hoc network, since these nodes are often constrained by resources.

Energy saving thermostats connected in a wireless mesh network provide for communication between a number of thermostats and one or more central system controllers. There are limits on the size of a single wireless mesh network which are dependent on factors such as the number of messages being sent, the size of the messages or maximum size of the messages, the time and the frequency between nodes receiving and forward messages, the number of wireless frequencies or channels used and other such factors. A limit on the number of nodes in a single wireless network may also be a design choice by the designer of a specific wireless mesh network, and the devices which implement it. For example, a wireless mesh network might be limited to 1024 nodes. A government or regulatory agency may also limit the choice of frequencies, the power, and the number of channels utilized in a network.

In a network of thermostats it is desirable that the thermostats check the status of controlled components fairly frequently such as every fifteen seconds. It may also be desirable for a thermostat to periodically communicate with a central server to receive commands or to report status. A reasonable period for this type of communication would also be every fifteen seconds. For example, it might be desired for an HVAC system controller to receive reports of temperature from every thermostat in the system every fifteen seconds.

It is noted that no matter what frequencies or number of channels are used, or what protocols are utilized with wireless mesh technology there will always eventually be a limit on the number of nodes in a single mesh network if a periodicity of communication between all nodes of the network is a design requirement.

BRIEF SUMMARY OF THE INVENTION

It is desirable however to provide for extension of the number of thermostats in an HVAC system beyond the limits of a single wireless mesh network. That is, it is desirable for a large HVAC system to allow for a plurality of wireless mesh networks that are within electrical range of each other in that the electrical transmission of data relating to one network may interfere with the communication of data in another nearby network. For example, one thousand thermostats and air conditioning units in one building controlled by one central control unit utilizing a wireless mesh network may be in radio proximity with another thousand thermostats and air conditioning units in a nearby building controlled by a different controller. Without some synchronization the transmissions of one network have potential for interfering with the transmissions of another network so as to prevent communication or to greatly lower the reliability or rate of such wireless mesh data traffic.

It would therefore be an advantage if a means of synchronizing electrical transmissions relating to the nodes of two or more wireless mesh networks so as to provide for expanding the maximum number of nodes in an HVAC system utilizing a wireless mesh network beyond the limit of the number of nodes in a single wireless mesh network.

In a first illustrated embodiment of the present invention a wireless mesh network is constructed utilizing a plurality of radio frequency channels and a well known technique of frequency hopping. A plurality of thermostats each acting as a node in the wireless mesh transmit there own data and also forward any received data on a regular basis such as every fifteen seconds. Air conditioning/heating units may also serve as a node in the mesh and be configured to receive control data from a specific thermostat. At least some of the nodes of the mesh are synchronized in time so as to avoid collisions of radio traffic. This synchronization is achieved by transmission of a synchronization signal from a "root" node, the root node being one node of the mesh which provides a synchronization signal to all other nodes. The root node may also be a computer or controller which provides overall control of the network, and which may also provide storage of historical data and may be further connected to a wider area network or to the internet for observation and control either locally or from a remote location. The individual nodes receive the synchronization signal the root node and are assigned time slots within a time of periodicity so that they do not transmit simultaneously and therefore the probability of successful communication is increased. It is noted that interference can still occur and that the protocols of the wireless mesh account for collisions and provide multiple paths for forwarding data. It is also noted that in a large network not all of the nodes will receive transmissions from every other node because the signals are low power and the thermostat nodes are spread out. The exemplary design incorporates a concept of "local" and "long distance" traffic. Local traffic is intended for communication between nearby nodes such as specifically between a thermostat and its controlled air conditioner. With a periodicity of for example fifteen seconds, a portion of the fifteen seconds is designated for "local" traffic, and a second portion of ten seconds is designated for the forwarding of "long distance" messages. The total data exchanged for local traffic may be much higher than that for long distance traffic if for example a thermostat communicates with its air conditioner every fifteen seconds, but reports its own status to a central controller only every few minutes.

In this first illustrated embodiment a second wireless mesh network is desired which is within radio range of interfering with the first wireless mesh network. As mentioned this could provide for two adjacent buildings in a single large hotel complex. In order to reduce interference between the two mesh networks it is therefore desirable for the periods of high mesh traffic scheduled on one network to be offset in time from a similar period of high mesh traffic on another or second mesh network.

It is noted that without synchronization between two large mesh networks that any drift in the time of periodicity would eventually result in the radio transmissions of the two networks being scheduled for an overlapping period of time which could interfere with or stop a large percentage of the data traffic. It is also noted that transmission of the synchronization pulses themselves in one network which typically hop from one frequency to another would also eventually collide on the same channel. It is further noted that without synchronization even with a small amount of drift that the two networks will eventually drift enough to begin interfering significantly with each other.

Synchronization between the root nodes may not be achievable directly because the two mesh networks are not in communication with each other over either of the "meshes" because they are independent, and also because they may be far enough away that any attempt at some sort of communication might not be reliable. Synchronization can however be achieved by selection of an outside source for a real time signal which can be reliably received by the root node of both mesh networks (or their associated controller or computer). Having both root nodes/controllers synchronized to a single real time signal allows for synchronization at the next level of the two wireless mesh networks themselves.

The National Institute of Standards and Technology (NIST) of the United States Department of Commerce provides access on the internet to a real time clock which is directly traceable to the official NIST time of day. This clock is accurate at its source within 200 picoseconds. There are known programs for various operating systems that provide for repeated sampling of the NIST clock over the internet so as to synchronize a clock on a personal computer (or any computer or other device) with the NIST time. This first illustrated embodiment of the present invention provides for each root node controller in a multiple mesh network system to be operatively coupled to a clock which is based upon the NIST time obtained over the internet. Synchronizing of a plurality of root nodes to the same clock thus provides for synchronization between the plurality of root nodes to a level adequate for use in scheduling time slots of the individual nodes of each mesh network.

That is, for example, the "local" traffic of one mesh network which tends to utilize all available radio bandwidth for a short period, can be scheduled to not overlap in time with the "local" high traffic period of another mesh network. This requires that each root node be given an identification tag that is utilized to determine an offset in time for transmission that is different than what will be chosen by other root nodes with a different identification tag. One exemplary means of determining an offset would be to guarantee that the last three "bits" of an identification tag be different for all mesh networks on the same property and these three bits can then be used by the root nodes to delay the start of local traffic to a period of time offset from the synchronization pulse. That is, mesh network zero with identification tag zero would start local traffic immediately after the local sync pulse. A second mesh network with identification tag one would start local traffic immediately after the time for local traffic utilized by the mesh with tag zero. Thus, the periods of high traffic are offset in time between two independent wireless mesh networks, allowing the two networks to operate in radio proximity with reduced chance of interference.

BRIEF DESCRIPTION OF THE SEVERAL VIEWS OF THE DRAWING

The invention will be better understood by means of the following description, given only as an example and in reference to the attached drawings. Other advantages, purposes and characteristics of the present invention will emerge from the following detailed description and with reference to the attached drawings, in which.

DETAILED DESCRIPTION OF THE INVENTION

Figure 1:
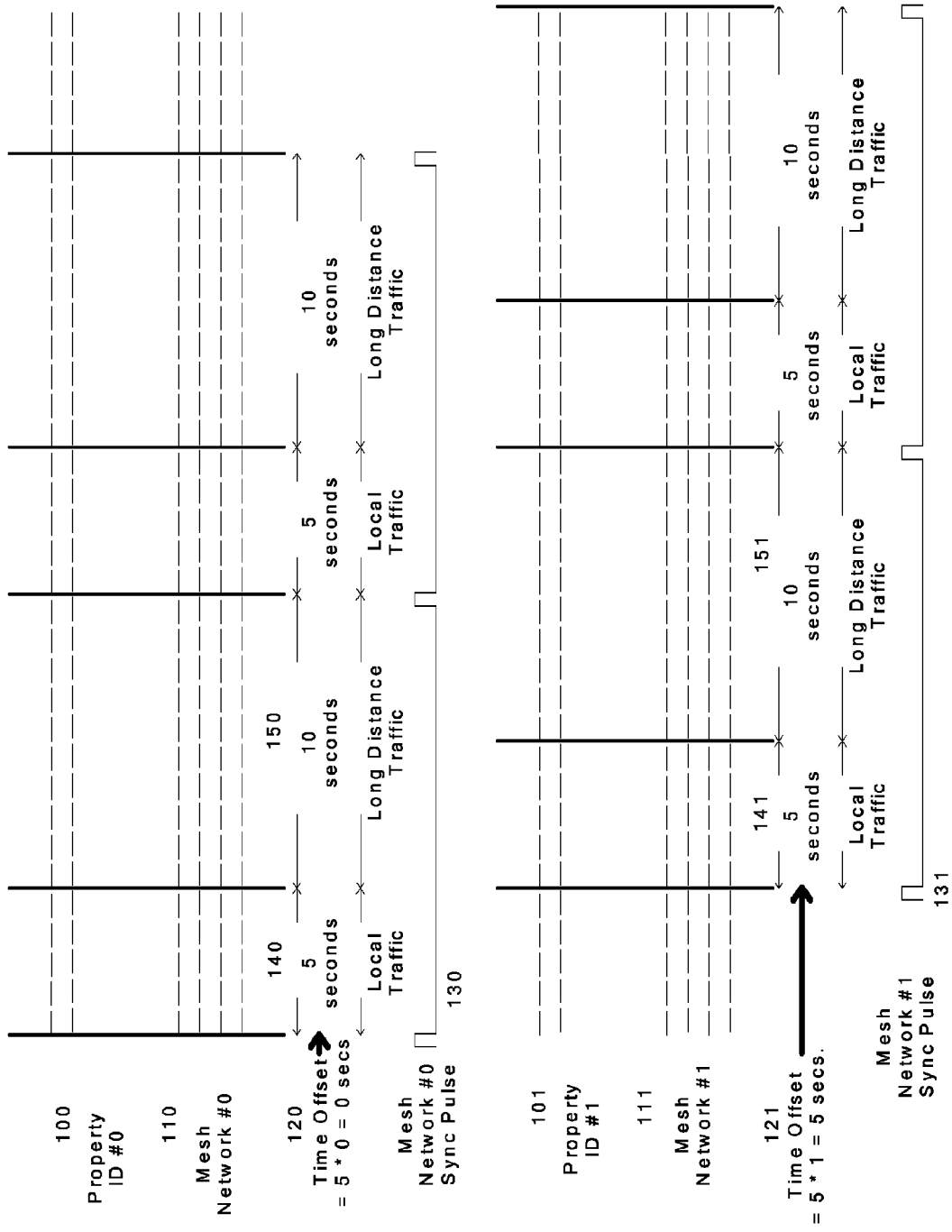
FIG. 1 illustrates two wireless mesh networks synchronized so as to reduce interference between the two wireless mesh networks.

An exemplary illustration of operation of two wireless mesh networks incorporating at least one feature of the present invention is shown in FIG. 1. In FIG. 1, a wireless mesh network #0 110 and a second wireless mesh network #1 111 are installed within two physical properties, property ID #0 100 and property ID #1 101 respectively. The two properties could, for example, be adjacent buildings in a hotel complex with the buildings close enough that possible radio interference might occur between wireless mesh networks installed in the two buildings. For illustrative purposes, wireless mesh network traffic on the two networks is coordinated within each network to be distributed periodically over a fifteen second period such that the first five seconds of the fifteen second period is utilized for "heavy" transmission of "local" network traffic, and the remaining ten seconds of each fifteen second period is utilized for transmission of less frequent "long distance" messages. During the period of transmission of local traffic many nodes will be transmitting signals. During the period of transmission of long distance traffic there would typically be fewer transmissions. In an illustration in practice of one aspect of the present invention, the time for local traffic 140 in wireless mesh network #0, and local traffic 141 in wireless mesh network #1 are coordinated so as to be offset in time with a result that local traffic of network #0 and local traffic of network #1 are unlikely to interfere with each other. This results in increased bandwidth for both of the two networks because of less interference which results in fewer collisions and retries of messages. As illustrated, the local traffic 140 and 141 of mesh network #0 and #1 respectively are synchronized to occur during the "long distance" time periods of the other network traffic, which is long distance traffic period 150 for mesh network #0 and long distance traffic period 151 for mesh network #1. The time period of the offset of each network 120 and 121, as an illustration, is calculated as an offset period of time multiplied by a configured wireless mesh network number. This offset time, or other ways of providing for offsets in time between coordinated networks could be determined by those skilled in the art and with knowledge of wireless mesh network design. The time offsets 120 and 121 are then utilized by a controller or control node or root node of each wireless mesh network to transmit or distribute a synchronization signal marked as items 130 and 131 for networks #0 and #1 respectively. All of the nodes in each wireless mesh network utilize their own respective synchronization signal (or "pulse") to coordinate in time of their own transmission of wireless mesh network messages.

Importantly, FIG. 1 also shows that the synchronization signal 130 of wireless mesh network #0 110 and the synchronization signal 131 of wireless mesh network #1 111 may both be pulse waveforms and may be substantially identical. The primary difference between the synchronization signal 130 of wireless mesh network #0 110 and the synchronization signal 131 of wireless mesh network #1 111 may be the time offset 120, 121 between the two synchronization signals. As discussed above, this offset time can be used by wireless mesh network #0 110 and wireless mesh network #1 111 to coordinate their own transmission of wireless mesh network messages.

Figure 2:
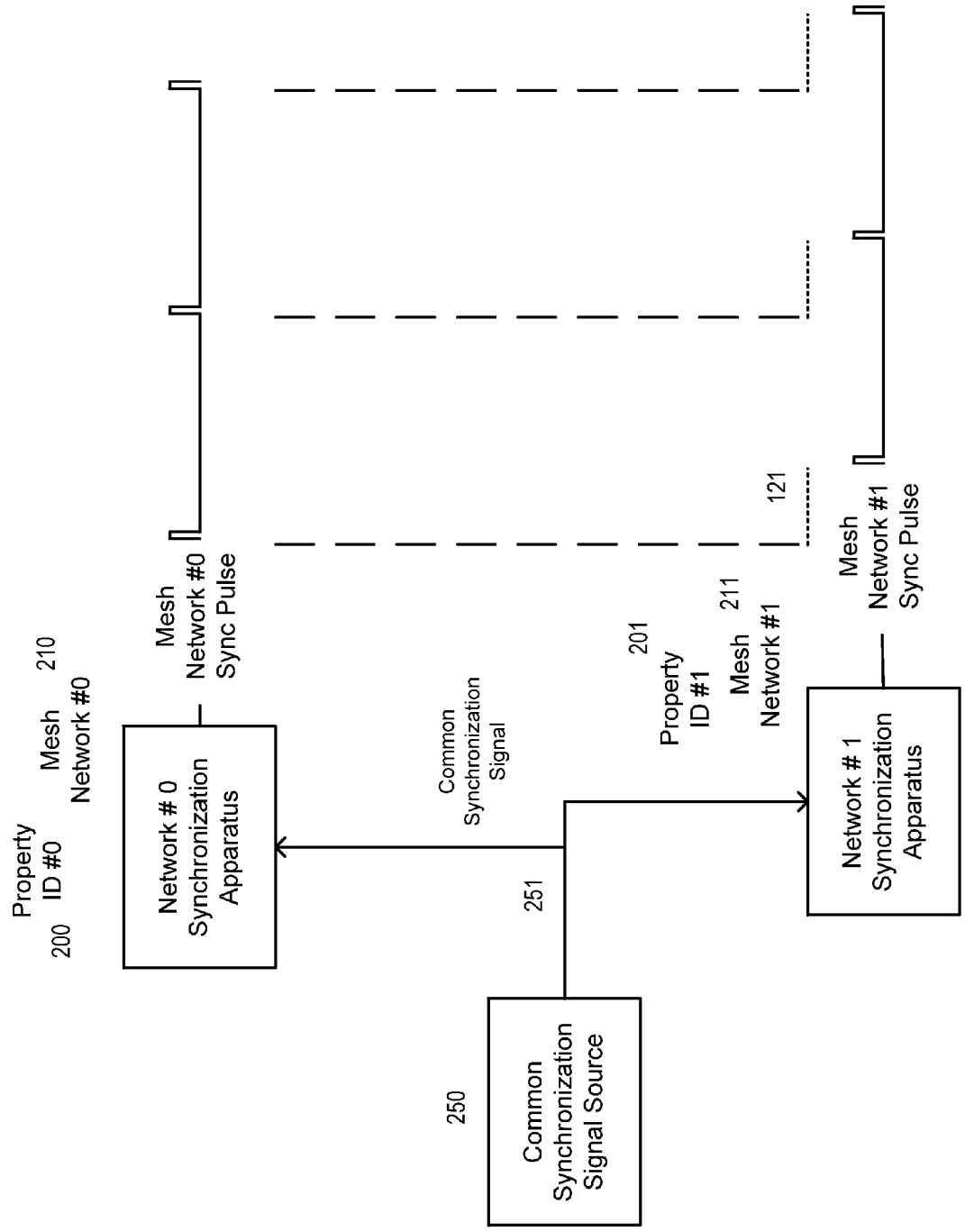
FIG. 2 illustrates synchronization between two wireless mesh networks utilizing a common synchronization signal source and a common syncrhonization signal operatively coupled to a synchronization apparatus for each of the two wireless mesh networks; and, FIG. 3 illustrates synchronization between two wireless mesh networks utilizing a synchronization signal source as might typically be provided from an internet web site, with synchronization optionally based upon an accurate determination of time of day.

FIG. 2 provides illustration of a common synchronization signal 251 provided to two wireless mesh networks #0 and #1 210 and 211 respectively from a common synchronization signal source 250. The wireless mesh networks 210 and 211 are installed in adjacent "properties" (for example, buildings) identified as property #0 200 and property #1 201 respectively. In this illustration the common synchronization signal is operatively coupled with connection being either "wired" or "wireless" as could be easily designed by one knowledgeable in the state of the art of electronic design and/or wireless mesh network design.

Figure 3:
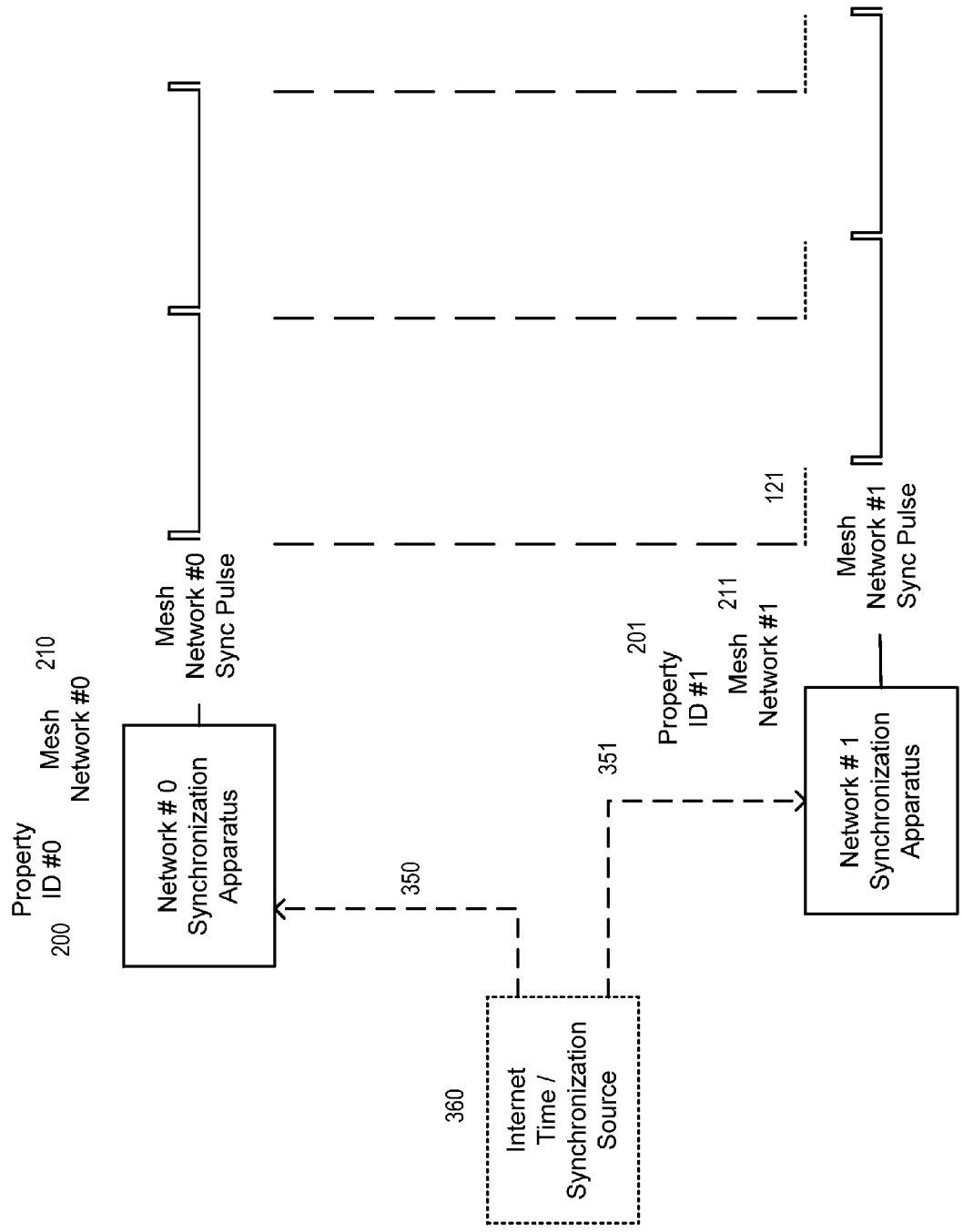

FIG. 3 is similar to FIG. 2 and provides a similar illustration with two synchronization signals 350 and 351 provided from a remote source such as an internet connection to a web site 360. In this illustration network #0 synchronization apparatus is connected to an internet time of day source. Network #1 synchronization apparatus is also connected to an internet time of day source, typically the same web site. The time of day is determined accurately by each of the two synchronization apparatus and that time of day is utilized to determine when the nodes of the two wireless mesh networks are coordinated to transmit.

It is noted that in this discussion the synchronization of all nodes in each network is provided by a synchronization signal, but other means of synchronization could be determined.

It is further noted that it is not necessary for a synchronization signal to be provided for every transmission period. Each node can keep track of its own time with the synchronization signal necessary only periodically to bring all nodes back into synchronization occasionally. That is, to reset synchronization so as to avoid "drift" of the time periods between the nodes.

It is also further noted that the network synchronization apparatus is optionally a root node of the wireless mesh network, or can also be any one of the wireless mesh network nodes configured to provide a synchronization signal to other nodes on the wireless mesh network. It would also be an option to provide a synchronization apparatus that is not an actual node in the wireless mesh network. For example, the synchronization apparatus for one or more of the wireless mesh networks could be implemented as a computer, or a computer for each wireless mesh network.

What is claimed is:

1. An energy management system incorporating a plurality of thermostats, each thermostat incorporating an apparatus for functioning as a wireless mesh network node, the energy management system comprising:
   A) a first wireless mesh network;
   B) a second wireless mesh network;
   C) a first group of the plurality of thermostats incorporated as first thermostat nodes in the first wireless mesh network;
   D) a second group of the plurality of thermostats incorporated as second thermostat nodes in the second wireless mesh network;
   E) a first root node serving as a controller for the first mesh network;
   F) a second root node serving as a controller for the second mesh network;
   G) wherein the first root node is operatively coupled to an internet server, the internet server providing time of day data to the first root node;
   H) wherein the second root node is also operatively coupled to the internet server, the internet server also providing the time of day data to the second root node;
   I) the first root node transmitting a first synchronization signal to the first group of thermostat nodes in the first wireless mesh network;

J) the second root node transmitting a second synchronization signal to the second group of thermostat nodes in the second wireless mesh network;

K) wherein the first synchronization signal and the second synchronization signal are both pulse waveforms and substantially identical with a time offset; and L) the first and second root nodes utilizing the first and second synchronization signals respectively so as to schedule a period for transmission of wireless mesh network traffic on the first wireless mesh network, and a period for transmission of wireless mesh network traffic on the second wireless mesh network, such that the first and second periods for transmission of wireless mesh network traffic on the first wireless mesh network and on the second wireless mesh network are based on the time offset so as to reduce interference between the first wireless mesh network and the second wireless mesh network.

2. An energy management system incorporating a plurality of thermostats, each thermostat incorporating an apparatus for functioning as a wireless mesh network node, the energy management system comprising:

A) a first wireless mesh network;
B) a second wireless mesh network;
C) a first group of the plurality of thermostats incorporated as first thermostat nodes in the first wireless mesh network;
D) a second group of the plurality of thermostats incorporated as second thermostat nodes in the second wireless mesh network;
E) a first root node serving as a controller for the first mesh network;
F) a second root node serving as a controller for the second mesh network;
G) wherein the first root node is operatively coupled to an external time source, the external time source providing time of day data to the first root node to create a first synchronization signal;
H) wherein the second root node is also operatively coupled to the external time source, the external time source also providing the time of day data to the second root node to create a second synchronization signal;
I) wherein the first synchronization signal and the second synchronization signal are both pulse waveforms and substantially identical with a time offset; and,
J) wherein the first and second root nodes utilizes the time of day data so as to create the first synchronization signal and the second synchronization signal, the first synchronization signal and the second synchronization signal used to create a period for transmission of wireless mesh network traffic on the first wireless mesh network and a period for transmission of wireless mesh network traffic on the second wireless mesh network with the periods for transmission of the first wireless mesh network and of the second wireless mesh network based on the time offset so as to reduce interference between the first wireless mesh network and the second wireless mesh network.

3. An energy management system incorporating a plurality of thermostats, each thermostat incorporating an apparatus for functioning as a wireless mesh network node, the energy management system comprising:

A) a first wireless mesh network;
B) a second wireless mesh network;
C) a first group of the plurality of thermostats incorporated as first thermostat nodes in the first wireless mesh network;
D) a second group of the plurality of thermostats incorporated as second thermostat nodes in the second wireless mesh network;
E) a first root node serving as a controller for the first mesh network;
F) a second root node serving as a controller for the second mesh network;
G) a synchronization apparatus providing a periodic synchronization signal;
H) wherein the first root node is operatively coupled to the synchronization apparatus and receiving the periodic synchronization signal to create a first synchronization signal;
I) wherein the second root node is also operatively coupled to the synchronization apparatus and receiving the periodic synchronization signal to create a second synchronization signal;
J) wherein the first synchronization signal and the second synchronization signal are both pulse waveforms and substantially identical with a time offset; and
K) wherein the first and second root nodes utilizes the first synchronization signal and the second synchronization signal to create a period for transmission of wireless mesh network traffic on the first wireless mesh network and a period for transmission of wireless mesh network traffic on the second wireless mesh network with the periods for transmission of the first wireless mesh network and the second wireless mesh network based on the time offset so as to reduce interference between the first wireless mesh network and the second wireless mesh network.

4. The energy management system of claim 3 with the thermostats and the root nodes programmed or configured with an identifier common to each wireless mesh network so as to determine which of the first wireless mesh network and the second mesh network to which they belong.

* * * * *